(12) United States Patent
Nelson

(10) Patent No.: US 7,736,560 B2
(45) Date of Patent: Jun. 15, 2010

(54) BIOLOGICAL POLYMERIC COMPOSITIONS AND METHODS RELATED THERETO

(75) Inventor: Michael A. Nelson, Owatonna, MN (US)

(73) Assignee: DiaServe, Inc., Blooming Prairie, MN (US)

( * ) Notice: Subject to any disclaimer, the term of this patent is extended or adjusted under 35 U.S.C. 154(b) by 0 days.

(21) Appl. No.: 11/934,508

(22) Filed: Nov. 2, 2007

(65) Prior Publication Data

US 2008/0125532 A1    May 29, 2008

Related U.S. Application Data

(60) Provisional application No. 60/864,085, filed on Nov. 2, 2006, provisional application No. 60/909,618, filed on Apr. 2, 2007.

(51) Int. Cl.
*B29C 47/00*    (2006.01)
(52) U.S. Cl. .................. 264/177.1; 524/436; 524/437; 524/599
(58) Field of Classification Search ............... 524/599, 524/437, 446; 264/177.1
See application file for complete search history.

(56) References Cited

U.S. PATENT DOCUMENTS

| | | | |
|---|---|---|---|
| 6,733,697 B2 | 5/2004 | Rhodes et al. | |
| 7,138,439 B2 * | 11/2006 | Scheer et al. | ............... 523/100 |
| 2004/0012004 A1 | 1/2004 | Rhodes et al. | |
| 2004/0036061 A1 | 2/2004 | Rhodes et al. | |
| 2005/0019545 A1 * | 1/2005 | Riebel | ..................... 428/304.4 |
| 2005/0123744 A1 | 6/2005 | Mohanty et al. | |
| 2007/0112107 A1 * | 5/2007 | Yamashita et al. | .......... 524/115 |
| 2007/0129467 A1 * | 6/2007 | Scheer | ....................... 524/47 |
| 2007/0259584 A1 | 11/2007 | Whitehouse | |
| 2008/0071018 A1 * | 3/2008 | Smillie et al. | ............... 524/437 |
| 2008/0113887 A1 * | 5/2008 | Scheer et al. | ............... 508/136 |
| 2008/0153940 A1 * | 6/2008 | Scheer et al. | ............... 523/124 |

OTHER PUBLICATIONS

"PCT Application No. PCT/US07/83506, International Search Report mailed Mar. 19, 2008", 3 pgs.
"PCT Application No. PCT/US07/83506, Written Opinion mailed Mar. 19, 2008", 6 pgs.

* cited by examiner

*Primary Examiner*—Peter Szekely
(74) *Attorney, Agent, or Firm*—Schwegman, Lundberg & Woessner, P.A.

(57) ABSTRACT

Embodiments of the present invention relate to a method of making a biopolymeric material comprising contacting a biopolymer and a binder sufficient to form a mixture, heating the mixture and profile extruding the mixture sufficient to create a biopolymeric material. Embodiments also relate to a method of making a biopolymeric material comprising contacting a biopolymer and a reactive composite sufficient to form a mixture, heating the mixture and profile extruding the mixture sufficient to create a biopolymeric material.

18 Claims, 2 Drawing Sheets

BIOLOGICAL POLYMERIC COMPOSITIONS AND METHODS RELATED THERETO

PRIORITY OF INVENTION

This non-provisional application claims the benefit of priority under 35 U.S.C. §119(e) to U.S. Provisional Patent Application Ser. No. 60/864,085, filed Nov. 2, 2006 and U.S. Provisional Patent Application Ser. No. 60/909,618, filed Apr. 2, 2007, which are herein incorporated by reference.

BACKGROUND

Polymers with higher melt indexes typically have lower viscosities and therefore do not have appropriate melt strengths suitable for profile extrusions. Such polymers pour out of the profile extrusion mold and do not hold shapes well. The polymers used for injection molding usually have melt indexes between 4 and 30 as compared to between 0.1 and 2 for profile extruding. Many polymers used in injection molding or other molding processes may be desirable for use in profile extrusion due to characteristics such as biodegradability, compatibility with additional components, "green" designation, etc., but are not able to be profile extruded due to their inherently high melt indexes. Many biopolymers, such as polyhydroxyalkanoate (PHA) and polylactic acid (PLA), have poor extensional viscosity which is important for profile extrusion. In profile extrusion, the polymers used must maintain a relatively high degree of melt strength and resist being "pulled or drawn" so as to retain shape.

Plasticizers are sometimes used to lower the melting point of a polymer and allow for lower processing temperatures. By using a plasticizer, the inherent mechanical properties of the polymer is changed, such as making it more flexible. The use of a plasticizer allows for lower processing temperatures, but also interferes with the polymer's viscosity, thus inhibiting the extrusion.

Polyvinyl chloride (PVC) is often used as the material of choice for architectural, fenestration and furniture components. Unfortunately, PVC has more recently been labeled as a harmful or poisonous plastic. Its manufacturing process produces harmful chemicals and expends high levels of energy. For recycling purposes, PVC may release harmful gases when burned and is not a substance that will readily compost.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

SUMMARY

Figure 1:
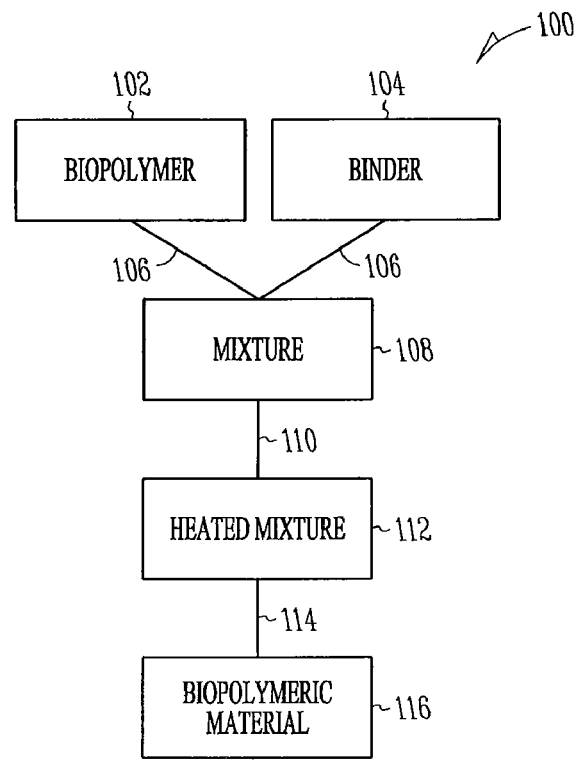
FIG. 1 illustrates a block flow diagram of a method of making a biopolymeric material, according to some embodiments.

Embodiments of the present invention relate to a method of making a biopolymeric material comprising contacting a biopolymer and a binder sufficient to form a mixture, heating the mixture and profile extruding the mixture sufficient to create a biopolymeric material. Embodiments also relate to a method of making a biopolymeric material comprising contacting a biopolymer and a reactive composite sufficient to form a mixture, heating the mixture and profile extruding the mixture sufficient to create a biopolymeric material.

DETAILED DESCRIPTION

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense, and the scope of the present invention is defined by the appended claims and their equivalents.

In this document, the terms "a" or "an" are used to include one or more than one and the term "or" is used to refer to a nonexclusive "or" unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

Embodiments of the invention relate to biological polymeric compositions or biopolymeric materials for profile extrusion. The embodiments of the invention allow for low temperature extrusion of biopolymers not previously capable of being profiled in such manufacturing processes. The profiled product may include mechanical properties similar to polyvinyl chloride (PVC), but may be "green" due to the use of the biopolymer and inclusion of additional components only capable of inclusion due to the low temperature process.

DEFINITIONS

As used herein, "biopolymer" refers to a polymer derived from a natural source, such as a living organism. A biopolymer may also be a combination of such polymers, such as in a mixture or as a copolymer, for example. A biopolymer may be a polymer derived from a natural source, such as a living organism. A biopolymer may be a sugar, for example. Polylactic acid (PLA) and polyhydroxyalkanoate (PHA) may be examples of a biopolymer. Biopolymers 102 may be derived from corn or soybeans, for example. A biopolymer may be a co-polymer or a mixture of more than one biopolymer, such as a mixture of PLA and PHA, for example.

As used herein, "binder" refers to a material that binds two or more materials together in contact or in close proximity. A binder may utilize cohesion or adhesion forces, for example.

The binder may be ethylene vinyl acetate (EVA), for example. The EVA may have a high degree of vinyl acetate additions and may have a low melt index. For Example, the EVA may be Elvax® 240 from E. I. du Pont de Nemours and Company, Wilmington, Del., USA. EVA may be a binder in a mixture of EVA and PLA, for example. The binder may be an elastomer with a lower melt point than a biopolymer in a mixture.

As used herein, "profile extrusion" or "profile extruding" refers to a manufacturing process used to create objects of a fixed cross-sectional profile. A material is pushed and/or drawn through a die of the desired profile shape.

As used herein, "melt flow" or "melt flow index" refers to a measure of the ease of flow of the melt of a thermoplastic polymer. It may be defined as the weight of polymer in grams flowing in 10 minutes through a capillary of specific diameter and length by a pressure applied via prescribed alternative gravimetric weights for alternative prescribed temperatures.

As used herein, "contacting" refers to physically, mechanically, chemically or electrically bringing two or more substances together or within close proximity. Contacting may be mixing or dry blending, for example.

As used herein, "mixture" refers to a composition of two or more substances that are not chemically combined with each other and are capable of being separated.

As used herein, "heating" refers to increasing the molecular or kinetic energy of a substance, so as to raise its temperature.

As used herein, "non-biodegradable" refers to a substance that is non-biodegradable for a significant amount of time. A non-biodegradable material may not substantially degrade after about 5 years, after about 10 years, after about 20 years or after about 30 years, for example.

As used herein, "reactive composite" refers to a binder in contact with a compatible material. An example of a reactive composite may be ethylene vinyl acetate and a biomaterial in contact with one another.

As used herein, "compatible material" refers to a material capable of forming a reactive composite by the contacting with a binder, such that a mixture or reaction product is formed. A compatible material may be a biomaterial or a binder.

As used herein, "additional component" refers to a component that may be contacted with a biopolymer and a binder or reactive composite for profile extrusion.

As used herein, "biopolymeric material" or "biological polymeric composition" refers to the profile extrusion product produced from one or more biopolymers and a binder, such as with PLA and EVA for example.

As used herein, "intumescent fire retardant" refers to a substance which swells as a result of heat exposure, thus increasing in volume, and decreasing in density which acts as a passive fire deterrent.

As used herein, "melting point" refers to the temperature or range of temperature at which a solid material changes state to a liquid material.

As used herein, "three-dimensional profile" refers to a profile extrusion product that comprises a specified three-dimensional shape, as controlled by the die through which it passed.

Referring to FIG. 1, a block flow diagram of a method of making a biopolymeric material 100 is shown, according to some embodiments. A biopolymer 102 may be contacted 106 with a binder 104, sufficient to provide a mixture 108. The mixture 108 may be heated 110, sufficient to provide a heated mixture 112. The heated mixture 112 may then be profile extruded 114 to form a biopolymeric material 116.

Contacting 106 the biopolymer 102 and binder 104 may include dry blending or mixing, for example. The mixture 108 may comprise from about 5% EVA to about 60% EVA, for example. The mixture 108 may comprise about 10% EVA, about 20% EVA, about 30%, about 40% EVA or about 50% EVA, for example. The binder 104 may be an elastomer with a lower melt point than the biopolymer 102. The binder 104 acts as a plasticizer and allows the biopolymer 102 to be processed at lower than expected temperatures. Binders 104 may be thermoplastic elastomers, metalocenes or other elastomeric materials with low melt indexes and low melt temperatures.

Some biopolymers 102, such as PLA and PHA, do not have sufficient melt strength to undergo profile extrusion as stand-alone materials. Once the biopolymer 102 has been contacted 106 with a binder 104 to create a mixture 108, it is heated 110. The binder 104, such as EVA, may have a low melting temperature, but may maintain a high viscosity or low melt index at higher processing temperatures. This allows the mixture 108 to have a lower overall melting processing point than the biopolymer 102 alone, while still allowing the mixture 108 to flow within a recommended processing range for profile extrusions and operate below the melting point of the biopolymer 102. The temperature used to heat the mixture 108 may be between about 135° C. to about 170° C., for example. The temperature may be about 140° C. to about 160° C. or about 145° C. to about 155° C., for example. The heating 110 may be at a temperature below the melting point of the biopolymer 102, such as a neat polylactic acid. An example melting point of PLA is about 410° F. or about 210° C., for example, so the processing temperature may be significantly lower than the melting point of the biopolymer 102. At about 210° C., the melt index of PLA is between about 5 and about 7. Recommended processing temperatures of PLA in the literature may be in the range of about 380° F. to about 420° F. (about 190° C. to about 215° C.), for example. Due to the nature of PLA, its melt flow index can not be lowered below such viscosity by itself. The mixture 108 also has reduced stickiness or adhesion as compared to a biopolymer, such as PLA, alone. This allows for more uniform flow and ease in processing.

The heated mixture 112 may be profile extruded 114. Profile extrusion 114 may include the melting, mixing and pumping of the heated mixture 112 through an extrusion line, such as with a single or twinscrew extruder, for example. The heated mixture 112 may be forced, using pressure, through a die. The die may be shaped in the desired form to create a profile. The die may be a profile-shaped hole in metal, for example. Once the heated mixture 112 passes through the die, it is cooled and cut to a specified length, forming a biopolymeric material 116. The biopolymeric material 116 may be a three-dimensional profile, for example.

The biopolymeric material 116 may be non-biodegradable for about 10 to about 20 years, for example. The biopolymeric material 116 may be non-biodegradable for about 5 years or about 10 years, for example. Further, the biopolymeric material 116 may be non-biodegradable for about 20 to about 30 years. This may be advantageous in that a component produced from such a material may withstand its product life (non-biodegradable), but once its use has worn out, it may biodegrade under commercial composting conditions. Not only can the biopolymeric material 116 be composted, if desired, but it can also be incinerated which may be beneficial in areas with limited landfill space. The biopolymeric material 116 has a low smoke index and minimal gas release, as compared to such petroleum-based polymers like polyvinyl chloride (PVC).

Figure 2:
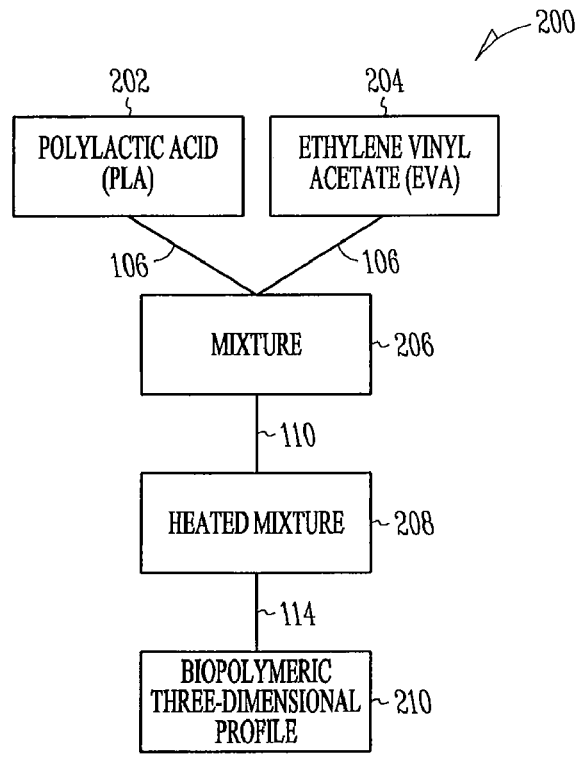
FIG. 2 illustrates a block flow diagram of a method of making a biopolymeric three-dimensional profile, according to some embodiments.

Referring to FIG. 2, a block flow diagram of a method of making a biopolymeric three-dimensional profile 200 is shown, according to some embodiments. Polylactic acid (PLA) 202 may be contacted 106 with ethylene vinyl acetate (EVA) 204, sufficient to provide a mixture 206. The mixture 206 may be heated 110, sufficient to provide a heated mixture 112. The heated mixture 208 may then be profile extruded 114 to form a biopolymeric three-dimensional profile 210.

The biopolymeric three-dimensional profile 210 may be a fenestration component, such as a window or door component, for example. The 3-D profile 210 may be a furniture or architectural component, for example. The 3-D profile 210 may be a wall sheet, corner guard, hand rail, baseboard, edgebanding, corrugated product, work surface laminate or millwork, for example.

Figure 3:
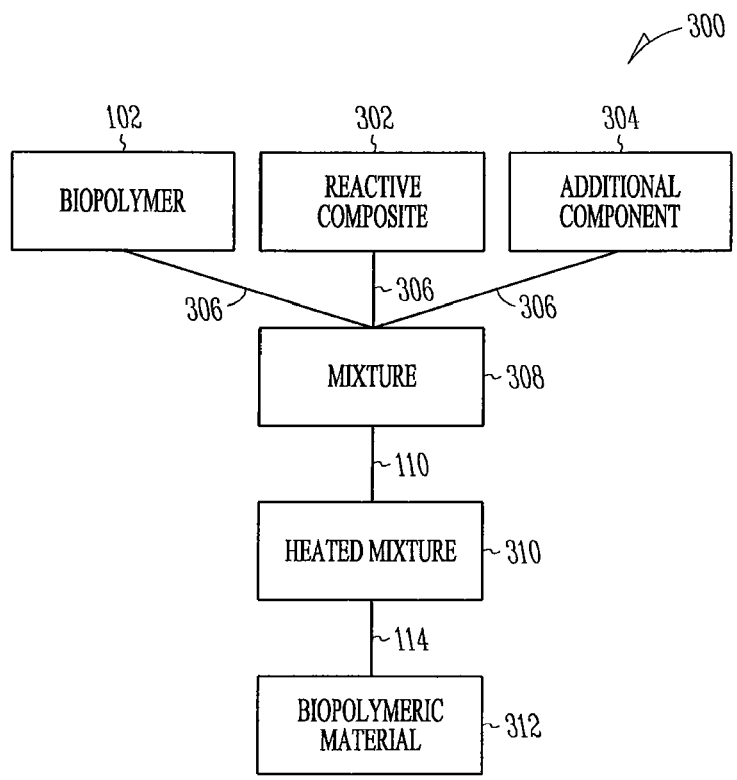
FIG. 3 illustrates a block flow diagram of a method of making a biopolymeric material utilizing a reactive composite, according to some embodiments.

Referring to FIG. 3, a block flow diagram of a method of making a biopolymeric material utilizing a reactive composite 300 is shown, according to some embodiments. A biopolymer 102 may be contacted 306 with a reactive composite 302 and an additional component 304, sufficient to provide a mixture 308. The mixture 308 may be heated 110, sufficient to provide a heated mixture 310. The heated mixture 310 may then be profile extruded 114 to form a biopolymeric material 312.

The reactive composite 302 may include a binder, such as ethylene vinyl acetate (EVA), and one or more compatible materials. The one or more compatible materials may include one or more biomaterials. Biomaterials may be cellulosic fibers, agricultural fillers, wheat straw, corn fiber, soybean, rice, oats, corn hulls, whole ground corn, corn gluten meal, wood fiber, wood flour, micron-sized processed agricultural fibers, submicron-sized processed agricultural fibers, protein flours derived from corn or protein flours derived from soybeans, for example. The compatible materials may include one or more minerals, for example, such as talc or calcium carbonate. The reactive composite 302 may be formed prior to contacting 306 with the biopolymer 102. One benefit of forming the reactive composite 302 before the contacting 306, would be to substantially remove water from the material prior to introducing it to the biopolymer 102.

The additional component 304 may be more than one additional component and may be contacted 306 with the reactive composite 302 and biopolymer 102 to serve a variety of functions. The additional component 304 may include calcium carbonate, wollastonite, mica, silica, alumina trihydrate, magnesium hydroxide, zinc borate, talc, calcium, titanium dioxide, fiberglass, carbon fibers and combinations thereof, for example. The additional component 304 may also include a processing aid, fire retardant, conductivity agent, mildewcide, anti-fungal agent, anti-bacterial agent, antioxidant, nanocomposite, blowing agent, decorative inclusions, plasticizer, elastomer, dye, pigment, antimicrobial agent, UV light stabilizer, insect inhibitor, thermal stabilizer and combinations thereof, for example. The additional component 304 may also be a biomaterial or mineral, as mentioned above. The additional component 304 may also be a decorative inclusion, such as fibers, natural fibers and colored plastics, for example.

The fire retardant may be an intumescent fire retardant, for example. The fire retardant may be alumina trihydrate (ATH), for example. For a product to be considered a "green" product, halogenated fire retardants are generally avoided. Non-halogenated systems may be mineral systems such as alumina trihydrate, magnesium hydroxide, phosphates, acids, ureas, or combinations thereof, for example. Many of these fire retardants release water or induce char as temperatures increase while burning. They also must be processed at lower temperatures to maintain their effectiveness as a fire retardant system. Typically, materials such as ATH require processing temperatures below 380° F., so as not to release water into the polymer melt stream which may cause problems and reduce its effectiveness as a fire retardant system.

The biopolymer 102 and binder 104 or reactive composite 302 may have a high limited oxygen index (LOI) which correlates to the degree of combustion of the material. Typically, materials at an LOI of 17 or lower will burn or support combustion under normal atmospheric conditions. Polyolefins and most plasticizers used with biopolymers 102, have a low LOI which leads to low flame resistance. The combination of biopolymer 102 and reactive composite 302 or binder 104 may have an LOI greater than 20, making the biopolymeric material produced substantially flame retardant. If in combination with a flame retardant, the material becomes even further flame resistant. For example, magnesium hydroxide may be contacted with a biopolymer 102, such as PLA, and a binder 104, such as EVA. The PLA and EVA both have relatively high LOI values. In combination with the magnesium hydroxide, the material generates very little to no smoke when burned and no black smoke (such as when PVC is burned). An example mix may be about 25% to about 65% magnesium hydroxide and about 75% to about 35% PLA and EVA. The PLA/EVA ratio may be between about 50/50 to about 10/90, for example.

Intumescent Fire Retardants

Currently used intumescent agents are generally constituted by the polymer of the system and at least three main additives: an essentially phosphorus-containing additive whose purpose is of forming, during the combustion, an impermeable, semi-solid vitreous layer, essentially constituted by polyphosphoric acid, and of activating the process of formation of intumescence; a second additive, containing nitrogen, which performs the functions of a foaming agent; and a third, carbon-containing additive, which acts as a carbon donor to allow an insulating cellular carbonaceous layer ("char") to be formed between the polymer and the flame. Phosphates that release phosphoric acid at high temperature may also be employed.

Recently, activated flame retardants described in the art may include an activated flame retardant comprising at least one nitrogenous phosphorus and/or sulfonate and at least one activator. An activator may include a char forming catalyst and/or a phase transfer catalyst. More specifically, activated flame retardants may include an activated nitrogenous phosphate flame retardant including the reaction product of: at least one nitrogen-containing reactant and at least one phosphorus-containing reactant capable of forming nitrogenous phosphate component, in the presence of at least one char forming tetraoxaspiro catalyst.

Examples of such compositions may be found in U.S. Pat. No. 6,733,697; U.S. patent application Ser. No. 2004/0036061 and U.S. patent application Ser. No. 2004/0012004, for example. Example flame retardants include CEASE-FIRE™ products (Cote-1 Industries, 1542 Jefferson Street, Teaneck, N.J. 07666) and INTUMAX® products (Broadview Technologies, 7-33 Amsterdam St., Newark, N.J. 07105) for example.

Generally, the activated flame retardants may be added into a biopolymeric material by dry mixing all or a number of components in a mixer, melt mixing, molding the components and the polymer simultaneously, by blending all the components together in powder form and thereafter, forming the desired product, such as by extruding, for example. The activated flame retardants may also be incorporated into a biopolymeric material by introducing the activated flame retardant during the reaction phase of one or more of the components of the material. It may be that incorporating the activated flame retardant in with the monomers prior to the formation of the polymer may further enhance the effectiveness of the activated flame retardant.

Char forming catalysts may include spiro-compounds represented by the following formula I:

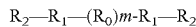

wherein m represents a number between 1 and 8, for example less than 3 or less than 2;

$R_0$—independently represent a di-, tri-, or quad-valent radical comprising two independently substituted or unsubstituted, saturated or unsaturated heterocyclic ring structures joined by at least one common carbon atom and preferably no more than two, for example one, carbon atoms common to the heterocyclic ring structures;

$R_1$—independently represents a bond; or a substituted or unsubstituted, saturated or unsaturated hydrocarbyl or heterocarbyl linking group, preferably a C1-C6 alkyl linking group, for example a C3 alkyl; and $R_2$-independently represents a terminal group, preferably a terminal amine for example a primary amine.

Examples of char catalysts include those wherein the heterocyclic ring structure comprises at least two hetero atoms in at least two heterocyclic ring structures, and/or $R_0$ independently represents a divalent radical, preferably with at least one, for example two (including two adjacent), heterocyclic ring structures being 6-member. These compounds may also include those wherein the hetero atom in the heterocyclic rings is predominately oxygen.

The char catalyst may include those having a molecular weight of at least 180, and/or a flash point of greater than 200° C. Exemplary char forming catalysts include derivatives of a tetraoxaspiro undecane, for example amine derivatives, for example 2,4,8,10-tetraoxaspiro-5,5-undecane-3,9-dipropamine. The char forming catalyst component may also include adducts, for example amine adducts, nitrile (include 2-propenenitrile) and/or oxirane (including butoxymethyl oxirane) adducts.

The phase transfer agent may be any component known for such purpose. Suitable phase transfer catalysts include tetrahydrocarbyl ammonium salts, for example tetramethyl, tetraethyl, tetrapropyl, tetralkyl, and/or aryltrialkyl ammonium salt wherein the salt is a bromide, chloride, hydroxide and/or hydrogen sulfate ammonium salt. The phase transfer catalyst may include phosphate esters, tetraethylammonium bromide, tetraethylammonium hydroxide, tetrapropylammonium bromide, tetrabutyl ammonium bromide, tetrabutyl ammonium hydroxide, tetrabutyl ammonium hydrogen sulfate and/or benzyltriethyl ammonium chloride, for example.

Due to the processing parameters utilized for producing the biopolymeric material of the embodiments of the present invention, many commonly utilized fire retardants may not be compatible. The intumescent fire retardants, such as activated flame retardants, mentioned above may allow the biopolymeric material to pass certain safety standards. An example of such a standard may be ASTM Designation E84-05, "Standard Method of Test for Surface Burning Characteristics of Building Materials." Other examples include UL 723, ANSI/NFPA No. 255 and UBC No. 8-1, for example.

For both the reactive composite 302 and the one or more additional components 304, the lower processing temperatures of the embodiments of the invention allow for the inclusion of such components in a way not done previously. The subsequent biopolymeric material 312 formed may include a wide variety of fillers or functional components that normally couldn't be included with such biopolymers 102 or in a profile extrusion process. The addition of biomaterials to the biopolymeric material 312 helps to designate or maintain the designation of the material as a "green" product.

Figure 4:
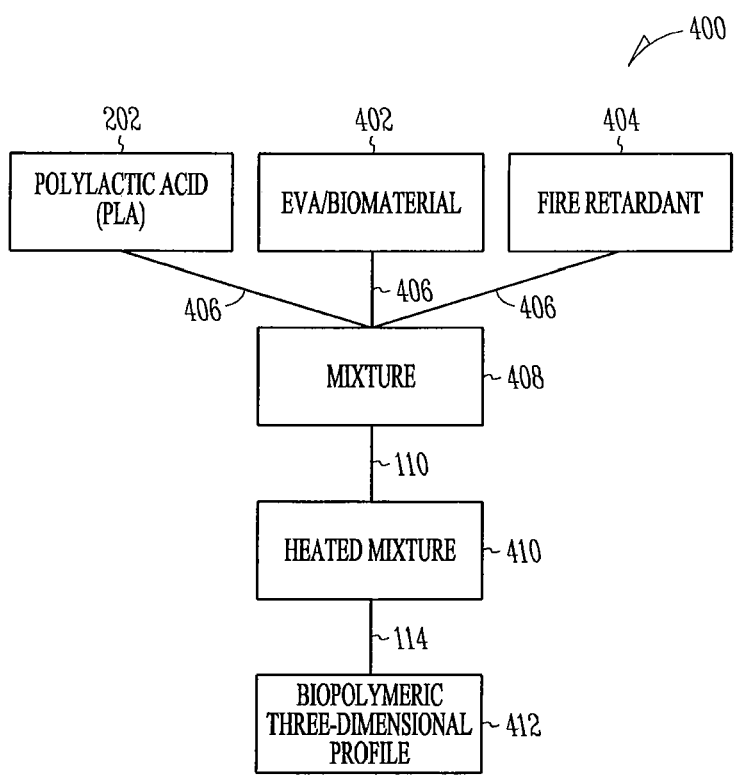
FIG. 4 illustrates a block flow diagram of a method of making a biopolymeric three-dimensional profile utilizing a fire retardant, according to some embodiments.

Referring to FIG. 4, a block flow diagram of a method of making a biopolymeric three-dimensional profile utilizing a fire retardant 400 is shown, according to some embodiments. Polylactic acid (PLA) 202 may be contacted 406 with EVA/biomaterial 402 and a fire retardant 404, sufficient to provide a mixture 408. The mixture 408 may be heated 110, sufficient to provide a heated mixture 410. The heated mixture 410 may then be profile extruded 114 to form a biopolymeric three-dimensional profile 412.

EXAMPLE I

Profile Extruding PLA

PLA or polylactic acid was obtained, originally produced by NatureWorks (Cargill). The grade of PLA was a 2002 with a melt index of 5-6. The material was dried at 80° C. for four hours. The material was placed into a Davis Standard single screw extruder at the recommended processing temperature of 420° F. (about 215° C.). The extruder was equipped with a rectangular profile die with an exit dimension of 0.375" by 0.750". The PLA under this condition was runny and of very low viscosity which poured out of the die with a consistency of warm honey. The material exhibited a high degree of stickiness which stuck to the die and brass scrapers used to clean the material from the hot die. The material had no melt strength and would not hold any shape.

EXAMPLE II

Profile Extruding PLA and EVA

The PLA 2002 was again added to the single screw extruder and the temperatures were dropped to 350° F. (about 177° C.) which was the published melting point of the PLA. The material was still running with similar viscosity to Example I. The temperatures were further reduced below the melting point of 350° F. (about 177° C.), and the material would not melt or flow creating excessive friction in the extruder and locking up the extruder.

During cleaning of the extruder, EVA ethylene vinyl acetate (Elvax) was used to purge the machine. The unmelted PLA was softened and then started to flow out of the plugged extruder. By the end of the purge cycle, 100% EVA was being used and the temperature of the extruder was dropped. At temperatures below 250° F. (about 120° C.), the EVA was still able to flow through the extrusion system. It was determined that mixing the EVA with the PLA allowed for significant reduction in processing temperatures and a significant reduction in stickiness of the PLA.

EXAMPLE III

Profile Extruding PLA and EVA

The following example used PLA 2002, polylactic acid, from Natureworks. The melt index of this material as stated on the processing guidelines was between 4-6 at 290° F. (about 143° C.). EVA ethylene vinyl acetate from General Polymers (Elvax extrusion grade) was blended at a ratio of 1 unit to 10 units of the PLA by volume.

The materials were dry blended together and placed into a single screw extruder. The processing temperatures were lowered from the published melt temperature. The resultant material did show a higher degree of melt strength and the material was noticeably less sticky on the hot die and on the brass tools used on the hot material.

EXAMPLE IV

Profile Extruding PLA and EVA

The same materials and percentages of material in Example III were used, but the temperatures of the extruder were dropped. The addition of EVA allowed the softening of the materials and maintained flow within the extruder. Temperatures were dropped to 300° F. (about 149° C.) and the melt temperature of the material was in a range between 300-305° F. (about 149-152° C.). At this point, the material showed a high degree of melt strength and was significantly less sticky allowing a shape to form which was within tolerance of the die exit.

EXAMPLE V

Profile Extruding PLA and EVA

The same materials and percentages of materials used in Example III were used and temperatures were further dropped to 280° F. (about 138° C.) and extruder RPMs were increased to create a higher level of shear and mixing. The processing shear was balanced at this low temperature to maintain the melt temperature of 300° F. (about 149° C.). Under this condition, the shear was introducing the majority of energy into the material versus resistance heat from the barrel. The material had even higher degrees of melt strength and improved overall consistency. After the material was allowed to cool, it had the highest mechanical integrity and held the shape closest to the exit shape of the die.

EXAMPLE VI

Profile Extruding PLA and EVA

A mixture of PLA 2002 and EVA Elvax at a 10:1 ratio by volume were dry blended and placed into an 3" single screw extruder. The extruder had a complex shape die that produced a part for office cubical corners. The part was a U-shaped part with wall thickness of 0.050". In addition, there was a partial hollow on the bottom of the part. The material was processed at 280° F. (about 138° C.). The extruder was started at a low RPM and the resultant material exiting from the extruder had a melt temperature of 290° F. (about 143° C.) and was non-uniform in mixture in which separate particles of PLA and EVA could be seen. The extrusion process RPM and related shear were increased until the material melt temperature was around 305° F. (about 152° C.). At this point, the material was very homogenous and maintained a high degree of melt strength without being sticky. The extruded material was run through calibration and did not stick to the aluminum calibration systems. The material was then continuously run through a water bath to cool the materials. No signs of inducing stress were seen and tolerance of the shape was maintained. At 120° F. (about 49° C.) the material would then be at sufficient mechanical strength to run through a puller and be cut into sections.

EXAMPLE VII

Profile Extruding PLA and EVA

A mixture of PLA 2002 and Elvax at a 10:2 ratio by volume were dry blended. The material was placed in the single screw extruder with processing temperatures set at 280° F. (about 138° C.) and the RPM used in Example VI. The material did maintain a shape but motor loads dropped from Example VI and the material was slightly less homogenous as compared to the 10:1 ratio.

EXAMPLE VII

Profile Extruding PLA, EVA and Additional Components

A dry blend of four materials were mixed

| | |
|---|---|
| EVA | 10% |
| PLA | 65% |
| ATH | 30% |
| Zinc Borate | 5% |

The powder/pellet mixture was placed into a single screw extruder with processing temperatures of 300° F. (about 149° C.). The motor load on the extruder peaked at maximum load. The resultant material was running with no melt strength and was not homogenous. A sample part could not be produced.

EXAMPLE IX

Profile Extruding PLA, EVA and Additional Components

Step I

Elvax extrusion grade EVA was dry blended with a aluminum trihydrate and Zinc borate on a weight basis

| | |
|---|---|
| EVA | 30% |
| ATH | 65% |
| Zinc Borate | 5% |

The material was run through a single screw extrusion system to compound and mix the materials. The resultant extruded material was ground using a granulator into small random particles.

Step II

Profile Extruding PLA, EVA and Additional Components

These resultant particles were then dry blended with PLA 2002 as follows;

| | |
|---|---|
| EVA/ATH/ZB | 50% |
| PLA 2002 | 50% |

The blended material was extruded using a single screw extruder at a process temperature setting of 290° F. (about 143° C.) and a melt temperature of 305° F. (about 152° C.). The resultant material was a homogenous material with good melt strength and a low degree of stickiness. Due to the high loading levels of the powdered fire retardant, the resultant material was rough on the surface and parts showed a high degree of brittleness, such that the parts could easily be broken by hand bending. The two step process gave the ability to blend the fire retardant with the EVA. The direct compounding of the powdered fire retardant to PLA created a breakdown of the PLA and a profile shape could not be produced.

EXAMPLE X

Profile Extruding PLA, EVA and Intumescent Fire Retardant

Elvax extrusion grade EVA was dry-blended with an intumescent fire retardant supplied by CeaseFire (Cote-L Corporation) at a 50/50 ratio. The material was placed into a single screw extruder at a temperature of 280° F. (about 138° C.) and compounded together. The resultant extrudant was granulated into fine particles.

The resultant material was dry blended with PLA at a 20% level so that the final level of the intumescent material was 10% of the total dry blend.

The material was extruded using a single screw extruder at a process set temperature of 285° F. with a melt temperature of 310° F. (about 154° C.). The resultant material from the extruder had a smooth surface and maintained a high degree of melt strength with minimal stickiness.

Samples were created and burnt using a small torch. The burnt material would form a foamed carbon char layer on the surface with minimal flame spread.

EXAMPLE XI

Profile Extruding PLA, EVA and Additional Components

An experiment was done using a 55 mm conical twinscrew extrusion system using a profile die with thick walls, full calibration and downstream systems. A blend of PLA and EVA at a 10:1 ratio by volume was mixed and placed into the twinscrew system. Processing temperatures were set to have the material melt temperature at 300° F. (about 149° C.). The material had a very good melt strength and minimal stickiness. The material was placed into a dry calibrator initially. The material did show some signs of sticking once the vacuum was applied to the calibrator which pulled the material to the walls. Water was added to the vacuum calibrator which then allowed the material to be calibrated. The material maintained good melt strength and final parts were of high strength with no brittleness. Processing speeds were at over 250 lbs per hour with a linear line speed of over 12 feet per minute given the profile shape. This ran faster than PVC used in the same machine, same tooling and processing parameters by well over 30%

At the end of the run, wood flour was added. The wood flour came from American Wood Flour and was 60 mesh average particle size. About 30% flour was added with the PLA/EVA biopolymeric material without predrying of the wood flour. The material was smooth and of very high strength. In previous tests using the same wood flour and PVC, the resultant material without predrying was rough and of poor strength.

EXAMPLE XII

Fire Testing of Material

An experiment was done using a thermal kinetic compounding system wherein 50% magnesium hydroxide was compounded with 25% PLA and 25% EVA at a temperature of 200° C. The resultant material was ground into particles and extruded at a temperature of 350° F. (about 177° C.) into a profile shape. The material was then burned. The material did not show any signs of dripping or liquid mobility and flame would extinguish upon removal of the torch. Testing was done in accordance with UL 94 methods and passed. The ratio between the PLA and EVA can be adjusted for processing or end product mechanical performance requirements.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A method of making a biopolymeric material, the method comprising:
    (a) contacting a biopolymer and a binder, sufficient to form a mixture;
    (b) heating the mixture at a temperature below the melting point of the biopolymer; and
    (c) profile extruding the mixture, sufficient to create a non-biodegradable biopolymeric three-dimensional profile material; wherein the three-dimensional profile material comprises one or more of a window component, a furniture component, architectural component or door component.

2. The method of claim 1, wherein the biopolymer comprises polylactic acid (PLA) polymer, polyhydroxyalkanoate (PHA) or a combination thereof.

3. The method of claim 1, wherein the binder comprises a thermoplastic elastomer.

4. The method of claim 1, wherein the binder comprises ethylene vinyl acetate (EVA).

5. The method of claim 1, wherein the heating comprises heating at a temperature of about 135° C. to about 170° C.

6. The method of claim 1, wherein the contacting occurs in the presence of an additional component.

7. The method of claim 6, wherein the contacting occurs in the presence of an additional component selected from the group of a processing aid, fire retardant, conductivity agent, mildewcide, anti-fungal agent, anti-bacterial agent, antioxidant, nanocomposite, blowing agent, decorative inclusions, plasticizer, elastomer, dye, pigment, antimicrobial agent, UV light stabilizer, and combinations thereof.

8. The method of claim 7, wherein the fire retardant comprises an intumescent fire retardant.

9. The method of claim 7, wherein the fire retardant comprises alumina trihydrate.

10. The method of claim 8, wherein the intumescent fire retardant comprises an activated flame retardant.

11. The method of claim 10, wherein the activated flame retardant comprises at least one nitrogenous phosphate and/or sulfonate component, and at least one char forming catalyst and/or a phase transfer catalyst.

12. The method of claim 10, wherein the activated flame retardant comprises the reaction product of: at least one nitrogen-containing reactant and at least one phosphorus-containing reactant capable of forming nitrogenous phosphate component, in the presence of at least one char forming tetraoxaspiro catalyst.

13. The method of claim 1, wherein the contacting occurs in the presence of an additional component selected from the group of calcium carbonate, wollastonite, mica, silica, alumina trihydrate, magnesium hydroxide, zinc borate, talc, titanium dioxide, fiberglass, carbon fibers and combinations thereof.

14. The method of claim 1, wherein the architectural components are selected from the group of wall sheets, corner guards, hand rails, baseboards and edgebanding.

15. The method of claim 1, wherein the biopolymeric material comprises a corrugated product, a work surface laminate or millwork.

16. The method of claim 1, further comprising before contacting, contacting the binder and one or more compatible materials, sufficient to form a reactive composite.

17. A method of making a biopolymeric material, the method comprising:
   (a) contacting a polylactic acid (PLA) and ethylene vinyl acetate (EVA), sufficient to form a mixture;
   (b) heating the mixture at a temperature below the melting point of the PLA; and
   (c) profile extruding the mixture, sufficient to create a non-biodegradable biopolymeric three-dimensional profile material; wherein the three-dimensional profile material comprises one or more of a window component, a furniture component, architectural component or door component.

18. A method of making a biopolymeric material, the method comprising:
   (a) contacting a biopolymer and a reactive composite, sufficient to form a mixture;
   (b) heating the mixture at a temperature below the melting point of the biopolymer; and
   (c) profile extruding the mixture, sufficient to create a non-biodegradable biopolymeric three-dimensional profile material; wherein the three-dimensional profile material comprises one or more of a window component, a furniture component, architectural component or door component.

* * * * *

UNITED STATES PATENT AND TRADEMARK OFFICE
CERTIFICATE OF CORRECTION

| | |
|---|---|
| PATENT NO. | : 7,736,560 B2 |
| APPLICATION NO. | : 11/934508 |
| DATED | : June 15, 2010 |
| INVENTOR(S) | : Michael A. Nelson et al. |

It is certified that error appears in the above-identified patent and that said Letters Patent is hereby corrected as shown below:

On the title page, item (75), in "Inventor", in column 1, line 1, after "(US)" insert -- ; Michael Riebel, Mankato, MN (US) --.

In column 7, line 46, delete "tetralkyl," and insert -- tetraalkyl, --, therefor.

In column 10, line 6, delete "EXAMPLE VII" and insert -- EXAMPLE VIII --, therefor.

In column 11, line 43, after "30%" insert -- . --.

Signed and Sealed this

Seventh Day of September, 2010

David J. Kappos
*Director of the United States Patent and Trademark Office*